United States Patent
Jia et al.

(10) Patent No.: US 11,146,672 B2
(45) Date of Patent: Oct. 12, 2021

(54) METHOD, DEVICE AND STORAGE MEDIUM FOR OUTPUTTING COMMUNICATION MESSAGE

(71) Applicant: Beijing Xiaomi Mobile Software Co., Ltd., Beijing (CN)

(72) Inventors: Weiguang Jia, Beijing (CN); Qiang Fu, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/836,629

(22) Filed: Dec. 8, 2017

(65) Prior Publication Data
US 2018/0167500 A1  Jun. 14, 2018

(30) Foreign Application Priority Data
Dec. 14, 2016  (CN) .......................... 201611155783.6

(51) Int. Cl.
*H04M 1/72436*  (2021.01)
*H04W 4/12*  (2009.01)
(Continued)

(52) U.S. Cl.
CPC ........ *H04M 1/72436* (2021.01); *H04L 51/22* (2013.01); *H04M 1/72433* (2021.01);
(Continued)

(58) Field of Classification Search
CPC ...... G05B 15/02; H04W 4/027; H04W 4/028; H04W 4/046; H04W 4/016; H04M 2242/30; H04M 2242/01
(Continued)

(56) References Cited

U.S. PATENT DOCUMENTS 9,406,103 B1  8/2016  Gray
2009/0267909 A1  10/2009  Chen
(Continued)

FOREIGN PATENT DOCUMENTS

| CN | 104144252 A | 11/2014 |
| CN | 105302458 A | 2/2016 |
| CN | 105607883 A | 5/2016 |

OTHER PUBLICATIONS

European Extended Search Report issued in corresponding EP Patent Application No. 17206776.1, dated Apr. 24, 2018, 8 pages.
(Continued)

*Primary Examiner* — Joshua L Schwartz
(74) *Attorney, Agent, or Firm* — Arch & Lake LLP

(57) ABSTRACT

The present disclosure relates to a method, a device and storage medium for outputting communication message in the field of communication technologies. The method includes: detecting operating information corresponding to a terminal when a communication message is received, wherein the operating information instructs an operation that is different from an interface switching operation; acquiring an output condition corresponding to the communication message to respond to the operating information detected; and outputting the communication message in a current interface when the operating information satisfies the output condition, where the current interface is different from a display interface that is preset for the communication message.

9 Claims, 11 Drawing Sheets

---

Detect operating information corresponding to a terminal when a communication message is received, the operation instructed by the operating information being different from an interface switching operation — 101

Acquire an output condition corresponding to the communication message to respond to the operating information detected — 102

Output the communication message in a current interface when the operating information satisfies the output condition, the current interface being different from a display interface corresponding to the communication message — 102

(51) Int. Cl.
    *H04M 1/72433*     (2021.01)
    *H04M 1/72454*     (2021.01)
    *H04M 1/72457*     (2021.01)
    *H04L 12/58*     (2006.01)

(52) U.S. Cl.
    CPC ... *H04M 1/72454* (2021.01); *H04M 1/72457* (2021.01); *H04W 4/12* (2013.01); *H04L 51/10* (2013.01); *H04L 51/38* (2013.01)

(58) Field of Classification Search
    USPC ......................................................... 455/412
    See application file for complete search history.

(56) References Cited

U.S. PATENT DOCUMENTS

| | | | |
|---|---|---|---|
| 2012/0284673 | A1 | 11/2012 | Lamb |
| 2013/0342672 | A1* | 12/2013 | Gray ..................... G06F 1/1686 348/78 |
| 2014/0171154 | A1 | 6/2014 | Chou |
| 2014/0191948 | A1* | 7/2014 | Kim ....................... G06F 3/0483 345/156 |
| 2014/0282877 | A1* | 9/2014 | Mahaffey .............. H04W 12/08 726/3 |
| 2015/0288640 | A1* | 10/2015 | Lee .......................... G06F 9/542 709/206 |
| 2016/0044091 | A1* | 2/2016 | Doumet .................. H04L 67/10 715/745 |
| 2016/0127360 | A1* | 5/2016 | Ball ..................... H04L 63/0861 726/7 |
| 2016/0274783 | A1 | 9/2016 | Schrock |
| 2017/0094484 | A1* | 3/2017 | Li ........................... H04L 51/24 |

OTHER PUBLICATIONS

Chinese Office Action (including English translation) issued in CN201611155783.6, dated Mar. 11, 2019, 12 pages.

\* cited by examiner

US 11,146,672 B2

METHOD, DEVICE AND STORAGE MEDIUM FOR OUTPUTTING COMMUNICATION MESSAGE

CROSS-REFERENCE TO RELATED APPLICATIONS

This application claims priority to Chinese patent application No. 201611155783.6, filed with the State Intellectual Property Office on Dec. 14, 2016, the entire contents of which are incorporated herein by reference in their entities for all purposes.

TECHNICAL FIELD

The present disclosure relates to the field of communication technologies and, more particularly, to a method, a device and storage medium for outputting a communication message.

BACKGROUND

With the development of communication technologies, there are a lot of communication applications (Apps) that can run on a terminal. The terminal can receive a communication message through a communication App running on the terminal, for example, the communication App like WeChat App, MiTalk App, QQ App, Microsoft Network (MSN) or the like.

SUMMARY

The examples of the present disclosure provide a method, a device and storage medium for outputting a communication message.

According to a first aspect of the present disclosure, a method of outputting a communication message is provided. The method may include: detecting operating information corresponding to a terminal when a communication message is received where the operating information instructs the operation that may be different from an interface switching operation, acquiring an output condition corresponding to the communication message to respond to the operating information detected, and outputting the communication message in a current interface when the operating information satisfies the output condition where the current interface may be different from a display interface that is preset for the communication message.

According to a second aspect of the present disclosure, a device for outputting a communication message is provided. The device may include one or more processors and a memory storage that stores one or more programs that are executable by the one or more processors, where the one or more processors may be configured to: detect operating information corresponding to a terminal when a communication message is received where the operating information instructs an operation that is different from an interface switching operation, acquire an output condition corresponding to the communication message to respond to the operating information detected and output the communication message in a current interface when the operating information satisfies the output condition where the current interface is different from a display interface that is preset for the communication message.

According to a third aspect of the present disclosure, there is provided a non-transitory computer-readable storage medium storing instructions. When the instructions are executed by a processor, the instructions may cause the processor to: detect operating information corresponding a terminal when a communication message is received where the operating information instructs an operation that is different from an interface switching operation, acquire an output condition corresponding to the communication message to respond to the operating information detected, and output the communication message in a current interface when the operating information satisfies the output condition where the current interface is different from a display interface that is preset for the communication message.

It should be understood that both the foregoing general description and the following detailed descriptions are only exemplary and explanatory and are not restrictive of the disclosure.

BRIEF DESCRIPTION OF THE DRAWINGS

In order to explain the technical solutions in the examples of the present disclosure more clearly, the drawings used in the descriptions of the examples will be briefly introduced hereinafter. Apparently, the drawings described hereinafter are merely some examples of the present disclosure, and a person of ordinary skill in the art may also obtain other drawings in accordance with these drawings without creative efforts.

Figure 1:
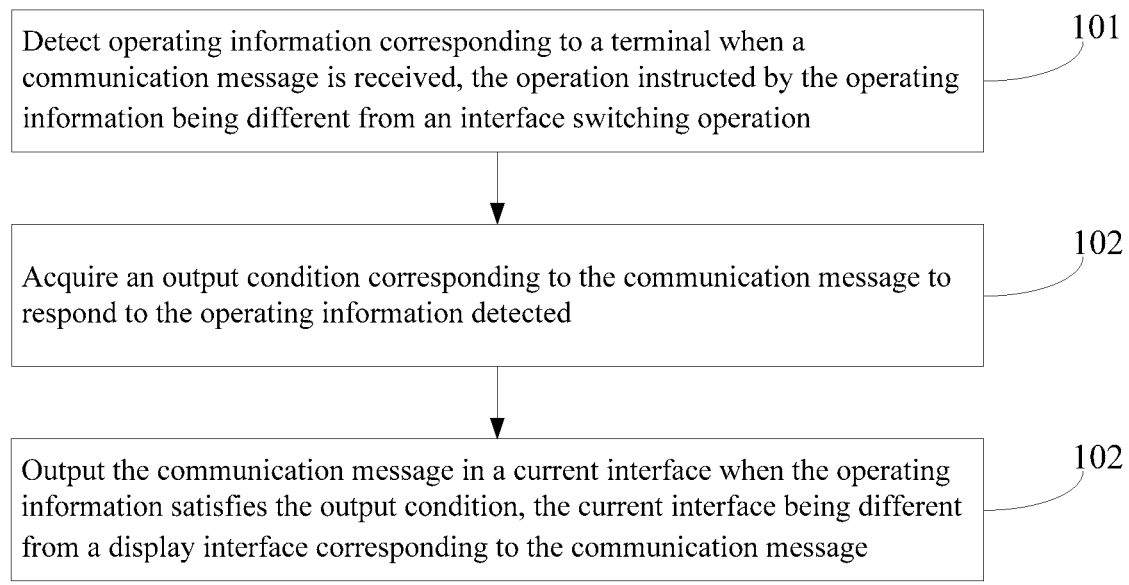
FIG. 1 is a flow chart of a method of outputting a communication message shown in accordance with an example.

The accompanying drawings are incorporated in and constitute a part of this specification, illustrate the examples that are consistent with the present and, together with the description, serve to explain the principles of the present disclosure.

DETAILED DESCRIPTION

Hereinafter examples will be described in detail, the examples are shown in the drawings. In the following description when referring to the accompanying drawings, the same numbers in different drawings represent the same or similar elements unless otherwise indicated. The examples described in the following description do not represent all examples consistent with the present disclosure. Rather, they are merely examples of devices and methods consistent with some aspects of the present disclosure as detailed in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

When the terminal receives the communication message, a user can operate and trigger the terminal to switch to a main interface of the App that receives the communication message. For example, the main interface of the App triggers the terminal to display and receive the communication message. Then the terminal displays a chat interface corresponding to the communication message in accordance with an operation of the user in the main interface, and outputs the communication message in the chat interface.

However, in this process, some problems may exist. Because the terminal needs to switch to the main interface of the App (i.e. the main interface of the App to be displayed by the terminal) and display the corresponding chat interface when outputting the communication message, the communication message output process may be complicated.

The method of outputting a communication message provided by the examples of the present disclosure can be implemented by a terminal, which may be a terminal having communication message receiving outputting functions. In practice, the terminal may also have the function of transmitting the communication message. The outputting communication message may include, but is not limited to, the terminal that displays communication message or the terminal plays communication messages and the terminal can output communication message in the current interface.

The current interface may be different from the display interface corresponding to the communication message. The current interface can be an interface that the terminal is displaying when the communication message is received, such as the main interface of the terminal. The display interface corresponding to the communication message can be an interface used to display the communication message such as a chat interface when the communication message is a chat message.

In the examples of the present disclosure, the terminal may be a smartphone, a tablet, a smart TV, an intelligent watch, an on-vehicle terminal, an intelligent wearable device, a moving picture experts group audio layer 5 (MP5) player, a portable laptop computer, a desktop computer, or the like.

FIG. 1 is a flow chart of a method of outputting a communication message shown in accordance with an example. In the example, the method of outputting a communication message is applied to a terminal for illustration. Referring to FIG. 1, the method of outputting a communication message may include the several steps.

At step 101, operating information corresponding to a terminal is detected when a communication message is received. The operation instructed by the operating information may be different from an interface switching operation;

At step 102, an output condition corresponding to the communication message is acquired to respond to the operating information detected.

At step 103, the communication message is output in a current interface when the operating information satisfies an output presenting condition, and the current interface may be different from a display interface corresponding to the communication message.

The communication message display interface can be a preset interface, such as a preset interface of the App in the terminal. The display interface may vary in accordance with different Apps and different communication messages. For example, the display interface can be a chat interface of the App when the communication message is a chat message, and can be an interface of the App used to display the notification message when the communication message is a notification message.

In conclusion, the method of outputting a communication message provided by the example of the present disclosure solves the problem of the complicated communication message output process and simplifies the communication message output process since the terminal outputs the communication message in the current interface when the operating information satisfies the output condition and does not need to switch to other interfaces.

Figure 2:
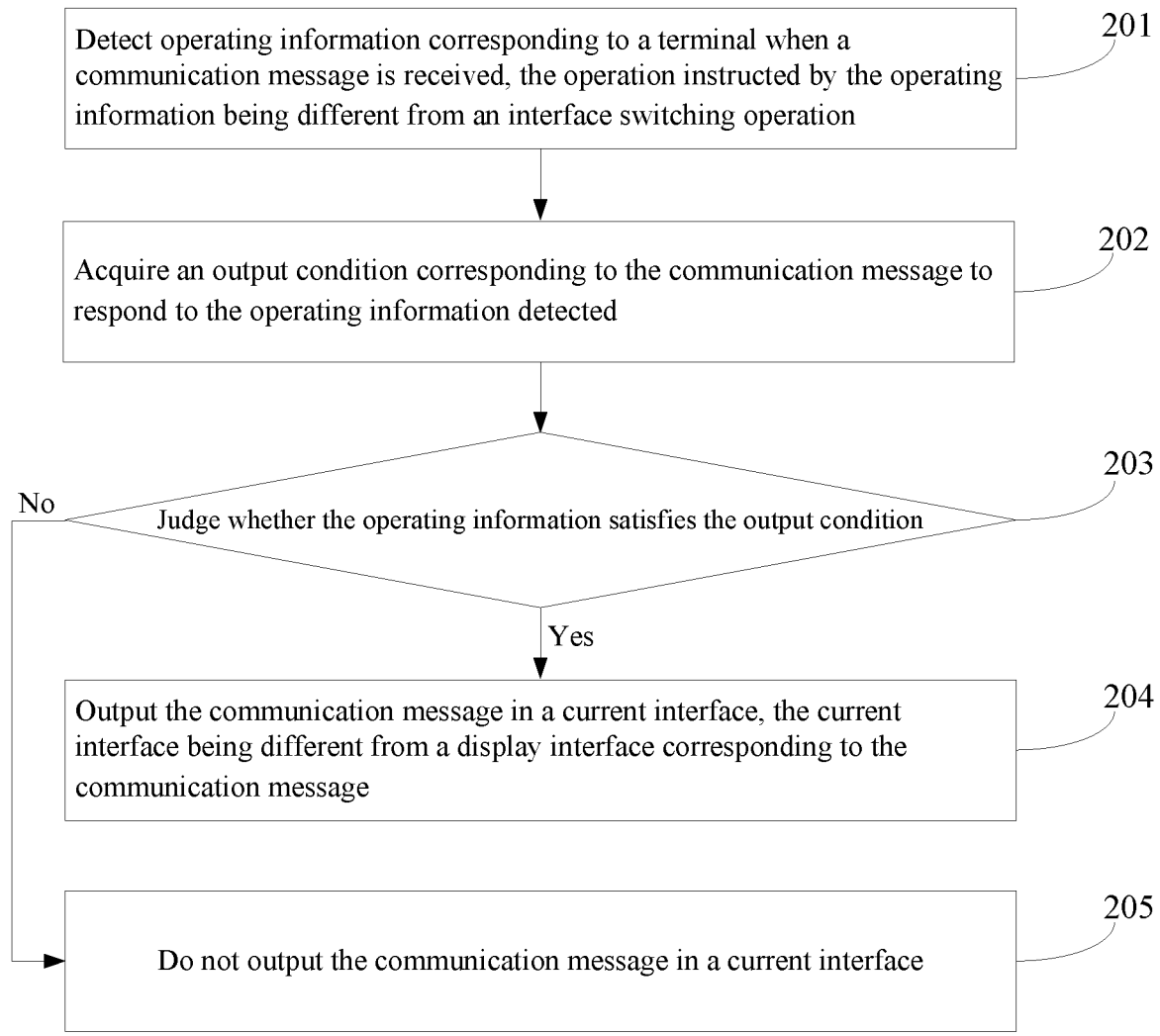
FIG. 2 is a flow chart of a method of outputting a communication message shown in accordance with another example.

FIG. 2 is a flow chart of a method of outputting a communication message shown in accordance with another example. In the example, the method of outputting a communication message is applied to a terminal for illustration. Referring to FIG. 2, the method of outputting a communication message may include the several steps.

At step 201, operating information corresponding to a terminal is detected when a communication message is received, and the operation instructed by the operating information may be different from an interface switching operation;

The communication message may include, but is not limited to: a chat message, push message and a notification message, and the communication message may be an audio message, a video message or a text message. In the example of the present disclosure, when the terminal receives the communication message, a user of the terminal may operate to trigger the operating information on the terminal, and the terminal may detect the operating information corresponding to the terminal, which is the operating information triggered by the operation of the user on the terminal. The operation instructed by the operating information is different from the interface switching operation. The operating information may instruct at least one of the following operations of the terminal: an operation of jittering, an operation of moving to a target position, and an operation of changing terminal orientation.

In the example of the present disclosure, the operation of jittering may be an operation of jittering that the user holds the terminal to perform, the operation of moving the terminal to the target position may be an operation that the user moves the terminal to the target position, and the operation of changing orientation may be an operation that the user moves the terminal to make the terminal orientation be changed.

An orientation sensor may be arranged in the terminal when the user moves the terminal. The orientation sensor in the terminal may detect the orientation change of the terminal. The orientation sensor may detect the jittering of the terminal when the user waggles the terminal. For instance, the orientation sensor may be a gyroscope sensor.

In the example of the present disclosure, the terminal's detecting the operating information corresponding to the terminal may include: the terminal detects operating information corresponding to the terminal in a preset time period. The preset time period may be a time period from a current moment to a moment that the communication message is received.

In some examples, when the communication message is received, the terminal may record the moment that the communication message is received, and in the preset time period after the communication message is received, the terminal may continue detecting the operating information corresponding to the terminal until the operating information is detected. Noticeably, the terminal may either detect operating information or not detect operating information any longer after the preset time period elapses. In some examples, a timer is arranged in the terminal, and the terminal may record the moment that the communication message is received via the timer in the terminal. However, the terminal may stop to detect the operating information after the preset time period passes by.

To be exemplary, provided that the moment that the terminal receives the communication message is 2016/11/30 19:18:20 (19:18:20 on Nov. 30, 2016) and the current moment is 2016/11/30 19:18:22 (19:18:22 on Nov. 30, 2016), then it can be determined by the terminal that the preset time period is 2 s; therefore, the terminal continues detecting operating information corresponding to the terminal in 2 s after receiving the communication message. It should be noted that the moment and the preset time period described at the step 201 are exemplary only, and cannot be used to limit the present disclosure. In practice, the preset time period can be 3 s, 4 s, 1 m or the like. Any solution following the same principle of the present disclosure is protected by the present disclosure, and is not elaborated again hereto.

At step 202, an output condition corresponding to the communication message is acquired to respond to the operating information detected.

After the operating information corresponding to the terminal is detected, the terminal may acquire an output condition corresponding to the communication message to respond to the operating information. In some examples, the output condition corresponding to the communication message may be stored in the terminal, and the terminal may acquire the output condition corresponding to the communication message through reading the output condition stored therein.

Alternative, the output condition corresponding to the communication message may be stored in a server, and the terminal may acquire the output condition corresponding to the communication message from the server. In the example of the present disclosure, the operating information can instruct at least one of the following operations: jittering, moving to the target position and changing an orientation of the terminal. The output condition may be different with respect to different operations instructed by the operating information. Therefore, with respect to the operation instructed by the operating information described at step 201, the output condition may include three possible situations as follows.

First situation: when the operating information instructs the operation of moving to a target position, the output condition may include that a distance between a target component of the terminal and a target object is shorter than a preset distance. The preset distance may be set in accordance with the actual demands. In the examples of the present disclosure, a distance sensor can be arranged at the position of the target component of the terminal and the preset distance can be set in accordance with the distance sensed by the distance sensor. For example, the preset distance can be 5 cm, 3 cm, 2 cm, etc., in accordance with the different distances sensed by the distance sensor.

The target object may be located near the target position (for example, the target object can be located on or in a sphere with the target object as the center of the sphere and with the preset distance as the radius of the sphere.), the terminal is provided with a distance sensing component and a handset, the target component may include the terminal handset, and the target object may include a user's ears. When the operating information instructs the operation of moving to the target position (i.e. the operating information instructs the operation of moving the terminal to a target position), the terminal may detect the distance between the terminal handset and the user's ears through the distance sensing component. In the examples of the present disclosure, the distance sensing component includes a distance sensor which is also called displacement sensor, and can be arranged near the terminal handset to facilitate detecting the distance between the terminal handset and the user's ears.

Figure 3:
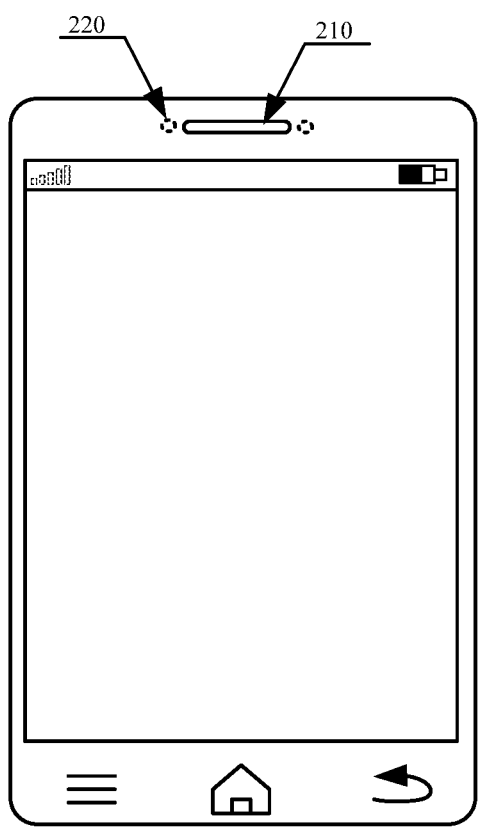
FIG. 3 is a structural schematic diagram of a terminal provided by the example illustrated in FIG. 2.
Figure 4:
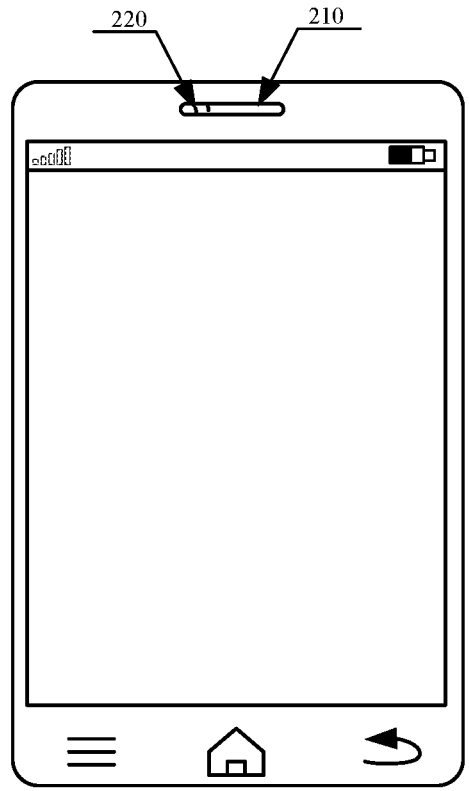
FIG. 4 is a structural schematic diagram of another terminal provided by the example illustrated in FIG. 2.

To be exemplary, as shown in FIG. 3, distance sensors 220 are arranged at the two sides of handset 210, and the distance between the distance sensor 220 and the handset 210 is shorter than the preset distance, which can exemplarily be 5 mm; or, as shown in FIG. 4, the handset 210 includes a handset groove (not shown in FIG. 4). The handset groove is used to set the handset 210 and the distance sensor 220 which can be arranged in the handset groove. Noticeably, the terminal includes a shell (not shown in FIG. 3 and FIG. 4), and the distance sensor 220 can be arranged in the shell of the terminal. In FIG. 3 and FIG. 4 the distance sensor 220 is depicted with a dotted line. The dotted line means that the distance sensor 220 is arranged in the terminal shell.

The distance sensor is a sensor which measures a distance between the distance sensor and an object using a "flying time" principle. The "flying time" calculates the distance between the distance sensor and the object by transmitting an optical pulse, and measuring the time interval between the moment that the optical pulse is transmitted and the moment that it is reflected back by the object.

In the example of the present disclosure, the distance sensor is arranged around the handset and can transmit an optical pulse. When the distance sensor receives the optical pulse which is reflected back, the distance sensor can determine the distance between the object around the handset and the terminal handset. In some examples, the distance sensor can calculate and obtain the distance between the object around the handset and the terminal handset in accordance with the time difference between the moment that the optical pulse is transmitted and the moment that reflected optical pulse is received and in combination with the velocity of light. The user usually puts the handset close to an ear to listen to the sound played from the terminal. When the distance sensor receives the optical pulse which is reflected back, the distance sensor may determine that the optical pulse which is reflected back is the optical pulse reflected by the user's ears; therefore, the distance sensor can calculate and obtain the distance between the user's ears and the handset.

Second situation: when the operating information instructs jittering, the output condition may include at least one of the followings: jittering times are the same as preset times, and jittering amplitude is greater than a preset amplitude.

When the output condition includes that the jittering times are the same as the preset times, the preset times can be stored in the terminal and the preset times can be fixed or changed. The output condition may include a plurality of preset times when the preset times are changed. In this case, the output condition may include a jittering times range (or called jittering times interval) and/or a jittering times set. The jittering times satisfying the output condition are the preset times. For example, the jittering times within the jittering times range are the preset times when the output condition includes the jittering times range. The jittering times within the set jittering times are the preset times when the output condition includes the preset times set.

To be exemplary, the jittering times range may be [3, 8], and the jittering times range includes jittering times 3, 4, 5, 6, 7 and 8; therefore, the preset times can be any one among 3, 4, 5, 6, 7 and 8. To be further exemplary, the jittering times set may be {3, 6, 9, 12}, and the jittering times set includes jittering times 3, 6, 9 and 12. Therefore, the preset times can be any one among 3, 6, 9 and 12. The jittering times are not limited by the examples of the present disclosure. In the example of the present disclosure, a sensor and a counter are arranged in the terminal. The terminal can detect the terminal's jittering via the sensor, and record the jittering times of the terminal via the counter. The sensor can be an acceleration sensor and the like.

When the output condition includes that the jittering amplitude is greater than the preset amplitude, the preset amplitude may be stored in the terminal. Usually, the preset amplitude is a fixed value and can be set with experience. In the example of the present disclosure, the terminal is provided with a sensor, and the terminal may detect the jittering amplitude of the terminal via the sensor. The sensor may be an acceleration sensor, and the like.

Third situation: when the operating information instructs the terminal's operation of changing an orientation of the terminal, the output condition may include at least one of the followings: the changed orientation is the same as a preset orientation and the orientation changing process is the same as a preset orientation changing process, which is continuous in a period of time.

When the output condition includes that the changed orientation is the same as the preset orientation, the preset orientation can be that the front of the terminal faces up, the front of the terminal faces down, or the front of the terminal faces up with a tilted angle from horizontal as the preset angle (for example, 90 degrees, 45 degrees), or the like. In the example of the present disclosure, a gyroscope sensor is arranged in the terminal, and the terminal can detect the orientation of the terminal via the gyroscope sensor to determine the orientation change of the terminal.

When the output condition includes that the orientation changing process is the same as the preset changing process, the preset orientation changing process can be a process of changing the orientation from the front of the terminal facing up to the front of the terminal facing down, a process of changing the orientation from the front of the terminal facing down to the front of the terminal facing up with a tilted angle from horizontal as the preset angle, or a process of changing the orientation from the rear of the terminal facing up to the front of the terminal facing up, or the like. In the example of the present disclosure, a gyroscope sensor is arranged in the terminal and the terminal can detect the orientation of the terminal via the gyroscope sensor to determine the orientation changing process of the terminal.

At step 203, judging whether the operating information satisfies the output condition. When the operating information satisfies the output condition, then step 204 is executed; when the operating information does not satisfy the output condition, then step 205 is executed.

After acquiring the output condition, the terminal may judge whether the operating information satisfies the output condition. In the example of the present disclosure, the output condition may be different with respect to different operations instructed by the operating information. The process of judging whether the operating information satisfies the output condition may be also different. With respect to the operation instructed by the operating information which is described at step 201 and the output condition described at step 202, the terminal may adopt different approaches to judge whether the operating information satisfies the output condition. Judging whether the operating information satisfies the output condition by the terminal may include the following three situations:

First situation: when the operating information instructs the operation of moving to a target position, the output condition can include: at the target position, a distance between a target component of the terminal and a target object is shorter than a preset distance. At this moment, the terminal may judge whether the distance between the target component of the terminal and the target object at the target position is shorter than the preset distance.

When the distance between the target component of the terminal and the target object at the target position is shorter than the preset distance, the terminal determines that the operating information satisfies the output condition. Otherwise, the terminal determines that the operating information does not satisfy the output condition. In some examples, the terminal may judge whether the distance between the target component and the target object is shorter than the preset distance by comparing the distance detected (i.e. the distance between the target component and the target object) with the preset distance.

To be exemplary, the distance detected can be the distance between the terminal handset and a user's ear. The terminal compares the distance detected with the preset distance to judge whether the distance between the terminal handset and the user's ear is shorter than the preset distance. Provided that the distance between the terminal handset and the user's ear is S1, the preset distance is S, and S1 is shorter than S, then the terminal determines that the distance between the terminal handset and the user's ear is shorter than the preset distance to determine that the operating information satisfies the output condition.

Second situation: when the operating information instructs the operation of jittering, the output condition can include at least one of the followings: jittering times are the same as preset times and the jittering amplitude is greater than a preset amplitude. In this situation, the terminal may either judge whether the jittering times are the same as the preset times, or judge whether the jittering amplitude is greater than the preset amplitude.

In some examples, the terminal may judge whether the jittering times are the same as the preset times by comparing the jittering times with the preset times. When the jittering times are the same as the preset times, then the jittering times are the preset times, and the terminal determines that the operating information satisfies the output condition. Otherwise, the terminal determines that the operating information does not satisfy the output condition.

Alternatively, as described at step 202, when the output condition includes the jittering times range and/or jittering times set, the terminal may judge whether the jittering times are the same as the preset times by judging whether the jittering times satisfy the output condition. For example, when the output condition includes the jittering times range and the jittering times are within the jittering times range, the terminal determines that the operating information satisfies the output condition; otherwise, the terminal determines that the operating information does not satisfy the output condition.

Alternatively, when the output condition includes the jittering times set and the jittering times are within the jittering times set, the jittering times are the preset times and the terminal determines that the operating information satisfies the output condition; otherwise, the terminal determines that the operating information does not satisfy the output condition; or, when the output condition includes the jittering times range and jittering times set, and when the jittering times are within the jittering times range or within the jittering times set, the jittering times are the preset times and the terminal determines that the operating information satisfies the output condition; otherwise, the terminal determines that the operating information does not satisfy the output condition.

To be exemplary, assuming the jittering time is 3 and the preset time is also 3, the terminal can determine that the jittering time of 3 is the same as the preset time of 3 by comparing the jittering time of 3 with the preset time of 3, to further determine that the operating information satisfies the output condition.

Alternatively, assuming the jittering time is 3 and the jittering times range is [3, 8], the terminal compares the jittering time of 3 with each jittering time within the jittering times range of [3, 8] to judge whether a jittering time being the same as the jittering time of 3 exits within the jittering times range of [3, 8]. Since there exists a jittering time being the same as the jittering time of 3 within the jittering times range of [3, 8], the terminal determines that the jittering time of 3 is within the jittering times range of [3, 8] and the jittering time of 3 is the preset time, to further determine that the operating information satisfies the output condition.

Alternatively, assuming the jittering time is 3, and the jittering times set is {3, 6, 9 12}, the terminal compares the jittering time of 3 with each jittering time within the jittering times set of {3, 6, 9 12} to judge whether a jittering time being the same as the jittering time of 3 exits within the jittering times set of {3, 6, 9 12}. Since there exists a jittering time being the same as the jittering time of 3 within the jittering times set of {3, 6, 9 12}, the terminal determines that the jittering time of 3 is within the jittering times set of {3, 6, 9 12} and the jittering time of 3 is the preset time, to further determine that the operating information satisfies the output condition.

In some examples, the mobile terminal can compare the jittering amplitude with the preset amplitude to judge whether jittering amplitude is greater than the preset amplitude. The terminal determines that the operating information satisfies the output condition when the jittering amplitude is greater than the preset amplitude. Otherwise, the terminal determines that the operating information does not satisfy the output condition. To be exemplary, assuming the jittering amplitude is 3 cm and the preset amplitude is 2 cm, the terminal can determine that jittering amplitude is greater than the preset amplitude after comparing the jittering amplitude with the preset amplitude, thereby determining that the operating information satisfies the output condition.

Third situation: when the operating information instructs the operation of changing an orientation of the terminal. The output condition can include at least one of the followings: the changed orientation is the same as a preset orientation and the orientation changing process is the same as a preset orientation changing process.

The terminal may either judge whether the changed orientation is the same as a preset orientation, or judge whether the orientation changing process is the same as a preset orientation changing process. In some examples, the terminal judges whether the changed orientation is the same as the preset orientation by comparing the changed orientation with the preset orientation; or, the terminal judges whether the orientation changing process is the same as the preset orientation changing process by comparing the orientation changing process with the preset orientation changing process.

To be exemplary, the preset orientation may be the front of the terminal facing up, and the terminal judges whether the changed orientation is the front facing up; when the changed orientation is the front facing up, then the terminal determines that the operating information satisfies the output condition; otherwise, the terminal determines that the operating information does not satisfy the output condition.

To be exemplary, the preset orientation changing process is a process of changing the orientation from the front facing up to the front facing down, and the terminal judges whether the orientation changing process is changing the orientation from the front facing up to the front facing down; when the orientation changing process is the process of changing the orientation from the front facing up to the front facing down, the terminal determines that the operating information satisfies the output condition; otherwise, the terminal determines that the operating information does not satisfy the output condition.

Noticeably, the foregoing operations instructed by the operating information and the output conditions are exemplary only. In practice, there are various operations instructed by the operating information; accordingly, there are also various output conditions.

For instance, when the operating information instructs a click operation, the output condition may include a multiple click operation corresponding to the communication message, or a multiple click operation corresponding to the communication message in a preset time period, or the like.

When the operating information instructs a slide operation, the output condition may include a slide operation with a preset slide trace and corresponding to the communication message. The multiple click operation corresponding to the communication message such as a double-click operation, i.e., click operation may be a double-click operation corresponding to the communication message. Noticeably, the multiple click operation corresponding to the communication message refers to a multiple click operation corresponding to the communication message in a preset duration; if the duration of the multiple click operation corresponding to the communication message exceeds the preset duration, then the multiple click operation corresponding to the communication message does not belong to the output condition.

The preset duration may be set with experience, for instance, 0.5 s, 0.4 s, 0.3 s, and the like. The slide operation with a preset slide trace and corresponding to the communication message includes, for example, drawing a preset graph around the communication message such as drawing a transverse line, drawing a box or drawing a circle. The operation of drawing a circle around the communication message may include: an operation of clockwise drawing a circle around the communication message or an operation of anticlockwise drawing a circle around the communication message; moreover, a trace of the circle obtained through the operation of drawing a circle may either be enclosed or semi-enclosed, and is not limited by the examples of the present disclosure.

At step 204, the communication message is output in a current interface, and the current interface is different from a display interface corresponding to the communication message.

If at step 203, when the terminal determines that the operating information satisfies the output condition, then the terminal outputs the communication message in the current interface, the current interface is different from the display interface corresponding to the communication message.

Figure 5:
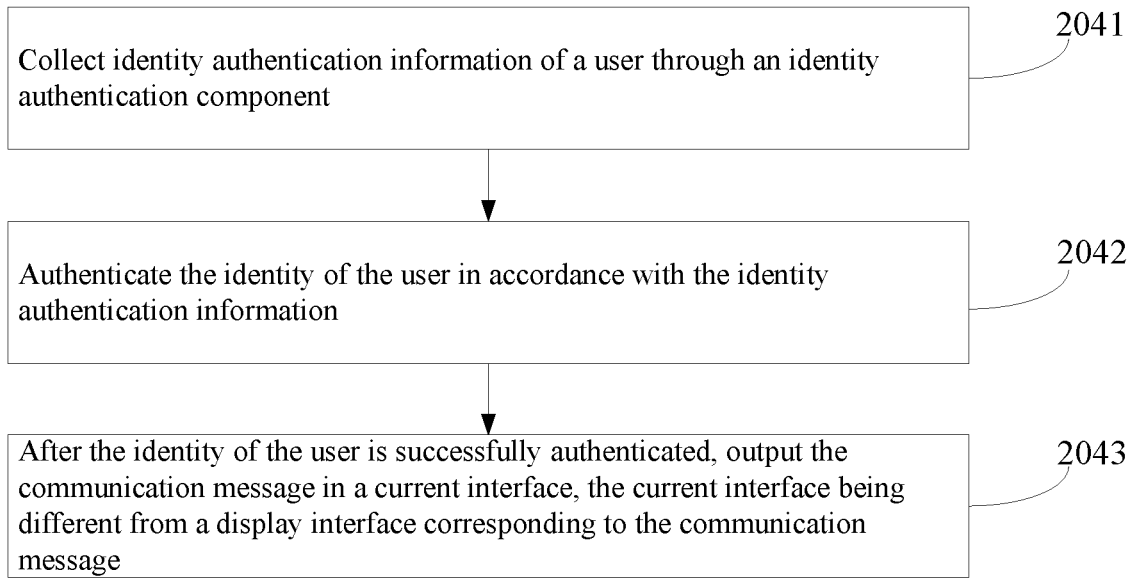
FIG. 5 is a flow chart of a method of outputting a communication message in a current interface provided by the example illustrated in FIG. 2.

In the example of the present disclosure, the terminal is provided with an identity authentication component which can collect identity authentication information of a user. To protect the user privacy and improve the information security, the identity of the user may be authenticated in accordance with the identity authentication information of the user when the terminal outputs the communication message in the current interface. To be exemplary, please refer to FIG. 5, which illustrates a flow chart of a method of outputting a communication message in a current interface provided by the example as illustrated in FIG. 2. Referring to FIG. 5, the method includes the following steps.

At sub-step 2041, the identity authentication information of a user is collected through an identity authentication component.

The terminal is provided with the identity authentication component, and the terminal may collect the identity authentication information of the user through the identity authentication component. The identity authentication component may be any of a fingerprint sensor, a palm print sensor, a voiceprint sensor, an iris identification camera, a facial recognition or the like.

Correspondingly, the identity authentication information may be any one of the followings: fingerprint information, palm print information, voiceprint information and iris information. That is to say, the identity authentication information is the fingerprint information when the identity authentication component is a fingerprint sensor; the identity authentication information is the palm print information when the identity authentication component is a palm print sensor; the identity authentication information is the voiceprint information when the identity authentication component is a voiceprint sensor; and the identity authentication information is the iris information when the identity authentication component is an iris identification camera. Noticeably, the process that the terminal collects the identity authentication information of the user through the identity authentication component, is not be elaborated in the examples of the present disclosure.

At sub-step 2042, the identity of the user is authenticated in accordance with the identity authentication information.

After collecting the identity authentication information of the user, the terminal may authenticate the identity of the user in accordance with the identity authentication information. In some examples, identity authentication information can be stored in the terminal, and a user corresponding to the identity authentication information stored in the terminal can make the terminal output the communication message in the current interface, and the terminal may look up the collected identity authentication information in the identity authentication information stored therein; when the terminal finds the collected identity authentication information in the identity authentication information stored therein, then the identity of the user is successfully authenticated by the terminal; when the terminal does not find the collected identity authentication information in the identity authentication information stored therein, then the identity of the user fails to be authenticated by the terminal.

At sub-step 2043, after the identity of the user is successfully authenticated, the communication message is output in the current interface, and the current interface is different from the display interface corresponding to the communication message.

When the identity of the user is successfully authenticated by the terminal at the foregoing sub-step 2043, then the terminal outputs the communication message in the current interface. The current interface is different from the display interface corresponding to the communication message.

In the example of the present disclosure, the current interface may be a screen lock interface, a black screen interface (i.e., the screen is in a dormant or off state), a webpage interface (i.e., interface displaying webpages), a video interface (i.e., interface playing videos), an audio interface (i.e., interface playing audios), or the like.

To be exemplary, provided that the current interface is a screen interface lock, then the terminal outputs the communication message in a screen lock interface; to be further exemplary, provided that the current interface is a black screen interface, then the terminal outputs the communication message in a black screen interface; to be still exemplary, provided that the current interface is an audio interface, then the terminal outputs the communication message in an audio interface, and is not elaborated by the example of the present disclosure herein.

In some examples, in the example of the present disclosure, the communication message may be an audio message, a video message or a text message, and the text message includes at least one of a word message and a picture message. When the communication message is an audio message or a video message, the terminal may play the communication message in the current interface; when the communication message is a text message, the terminal may display the communication message in the current interface.

Figure 6A:
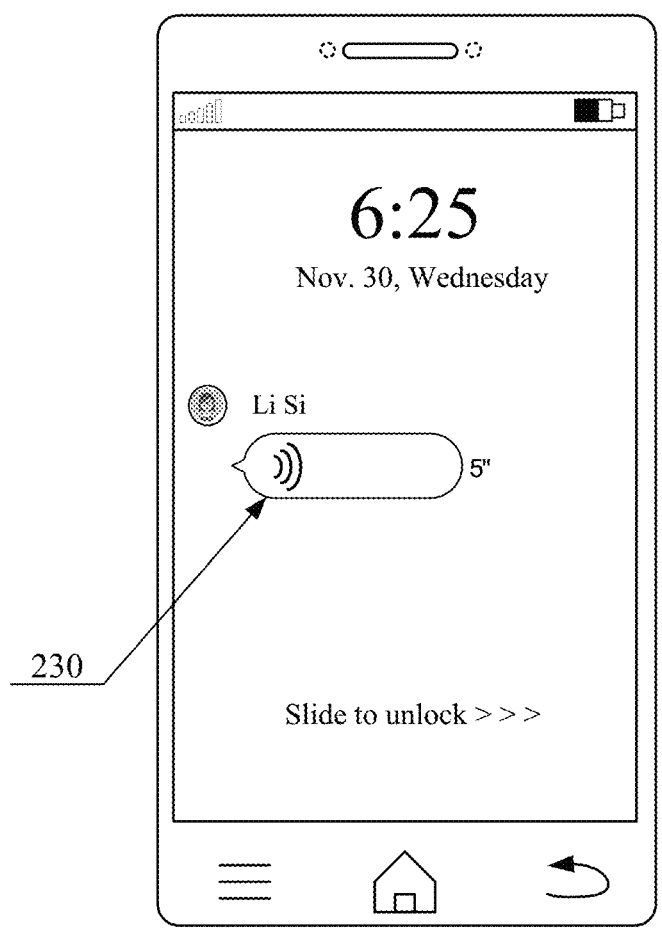
FIG. 6A is a schematic diagram of outputting an audio message in a current interface provided by the example illustrated in FIG. 2.
Figure 6B:
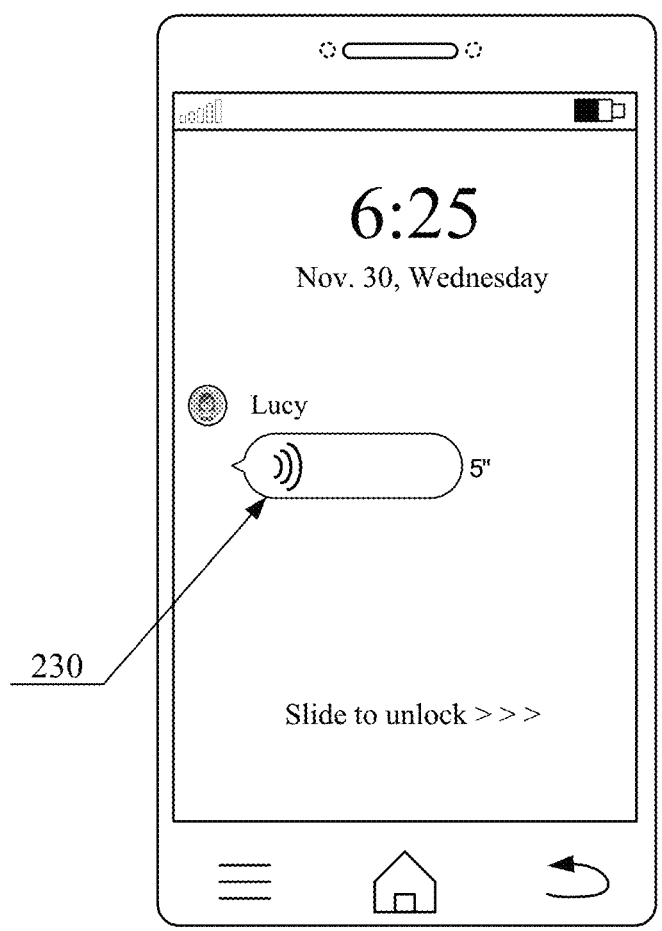
FIG. 6B is another schematic diagram of outputting an audio message in a current interface provided by the example illustrated in FIG. 2.
Figure 7:
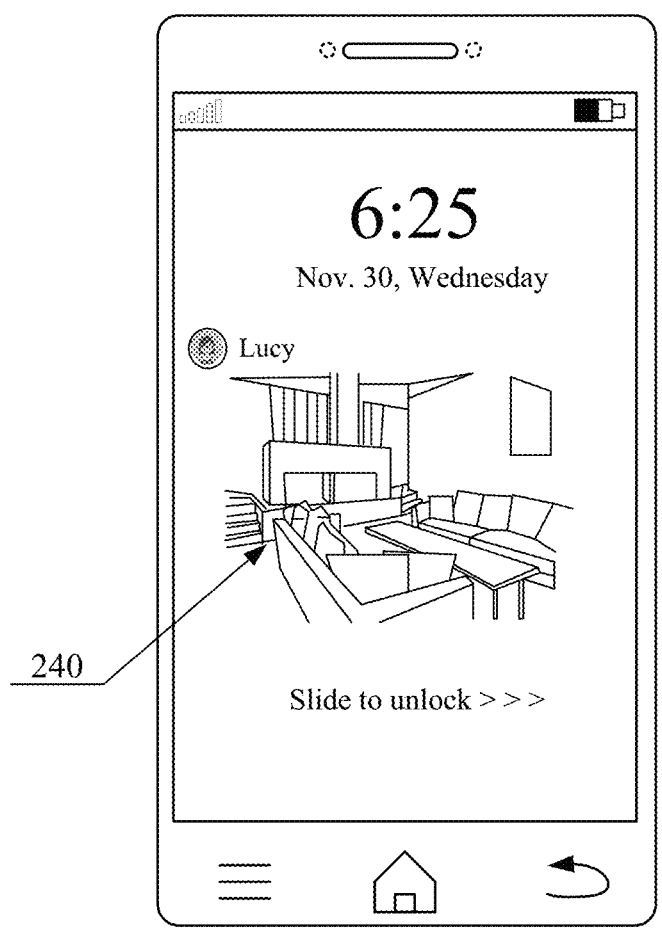
FIG. 7 is an additional schematic diagram of outputting a video message in a current interface provided by the example illustrated in FIG. 2.
Figure 8A:
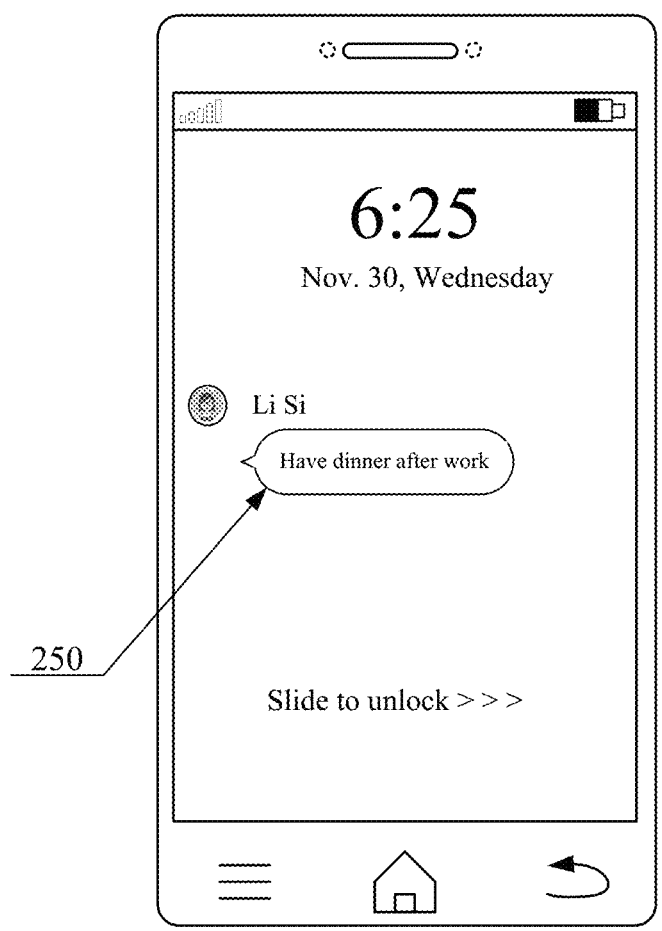
FIG. 8A is yet another schematic diagram of outputting a text message in a current interface provided by the example illustrated in FIG. 2.
Figure 8B:
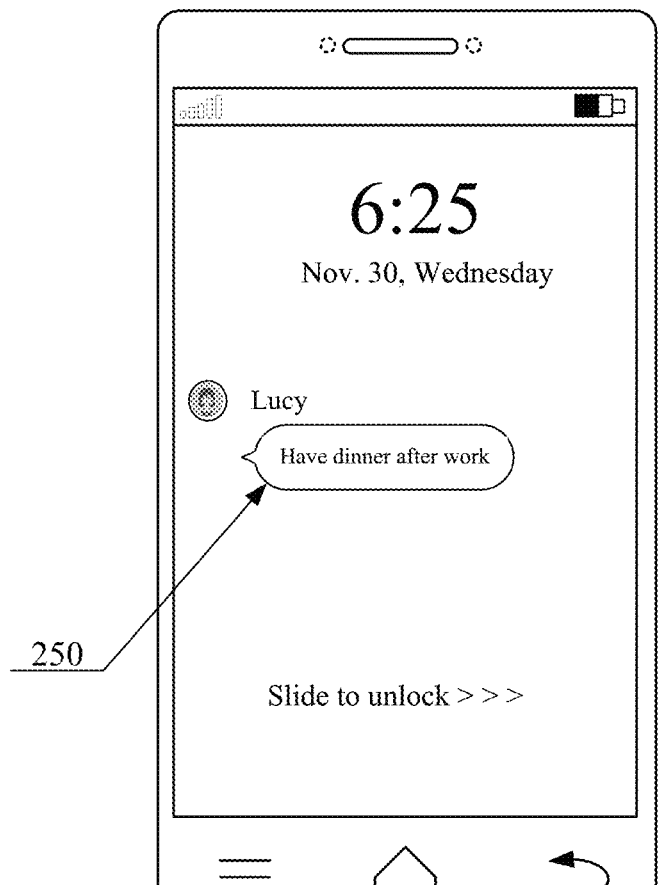
FIG. 8B is yet an additional schematic diagram of outputting a text message in a current interface provided by the example illustrated in FIG. 2.

For example, it is illustrated in the example of the present disclosure that the current interface is a screen lock interface. As shown in FIGS. 6A and 6B, the terminal plays an audio message 230 in the screen lock interface; as shown in FIG. 7, the terminal plays a video message 240 in the screen lock interface; as shown in FIGS. 8A and 8B, the terminal plays a text message 250 in the screen lock interface.

Noticeably, when outputting the communication message in the current interface, the terminal may also output a transmitter of the communication message, such as the name of the transmitter. The name of the transmitter may be "Lucy" as shown in FIG. 6B, FIG. 7 and FIG. 8B. FIGS. 6A and 6B provided by the example of the present disclosure are exemplary only. In practice, the terminal can directly play the audio message in the current interface without displaying the audio message, which is not limited by the examples of the present disclosure.

It should be further noted that it is explained in the example of the present disclosure that the current interface may be a screen lock interface. When the current interface is a black screen interface, and the communication message is a video message or a text message, the terminal may wake up the screen first to make the terminal be in the screen lock interface, and then outputs the communication message in the screen lock interface, which is not elaborated by the example of the present disclosure.

Noticeably, in the example of the present disclosure, when the communication message includes a text message, the terminal's displaying communication message in a current interface may include: determining a target display area for displaying the communication message in the current interface in accordance with content displayed on the current interface.

In some examples, the terminal can firstly determine the content displayed on the current interface, and the content can be news, a video, and the like. The target display area can be a marginal area of the current interface, or a central area of the current interface. The terminal can display the communication message in the marginal area of the current interface or in the central area of the current interface. The terminal's displaying the communication message in the marginal area on the current interface can prevent the displaying process of the communication message from influencing the content displayed in the current interface. The terminal's displaying the communication message in the central area on the current interface can make the communication message more eye-catching, so as to be convenient for use's reading. It should also be noted that, in practice, the terminal display the semitransparent communication message in a current interface to prevent the displaying process of the communication message from influencing the content displayed in the current interface.

Figure 9:
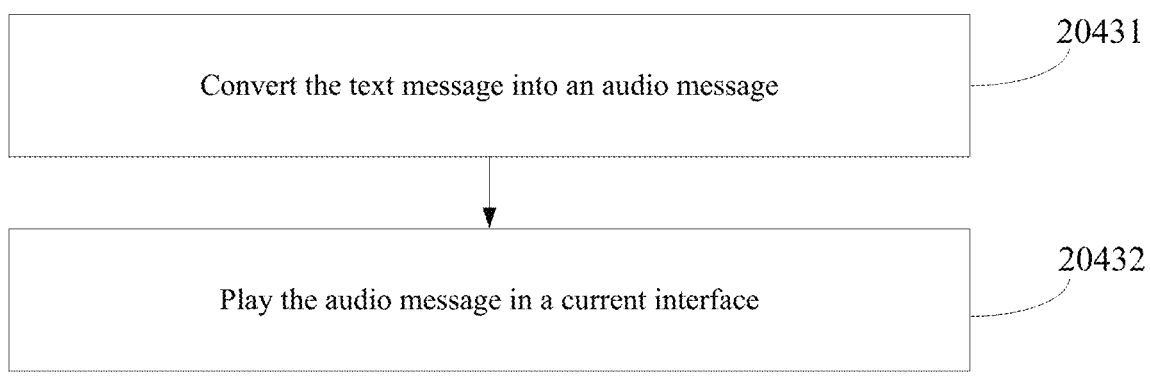
FIG. 9 is a flow chart of a method of outputting a communication message in a current interface provided by the example illustrated in FIG. 2.

Noticeably, it is explained above that the terminal displays the text message in the current interface. In the example of the present disclosure, when the communication message is a text message, the terminal may also convert the text message into an audio message and play the audio message in the current interface. To be exemplary, please refer to FIG. 9, which illustrates a flow chart of a method of outputting a communication message in a current interface provided by the example illustrated in FIG. 2. Referring to FIG. 9, the method includes the followings.

At sub-step 20431, the text message is converted into an audio message.

In some examples, the terminal may convert the text message into an audio message by using speech recognition technology. The text message may be a word message or a picture message. Therefore, the terminal may convert the word message or picture message into a voice message by using speech recognition technology. To be exemplary, the terminal converts a word message "Dinner together after work" into an audio message by using speech recognition technology. Where the implementation process that the terminal converts the text message into the audio message by using speech recognition technology is not be elaborated by the example of the present disclosure.

At sub-step 20432, the audio message is played in the current interface.

After converting the text message into the audio message, the terminal may play the audio message in the current interface. To be exemplary, provided that the current interface is a screen lock interface, the terminal plays the audio message in a screen lock interface. To be further exemplary, provided that the current interface is a video interface, the terminal plays the audio message in a video interface. To be still exemplary, provided that the current interface is an audio interface, then the terminal plays the audio message in an audio interface.

At step 205, the communication message is not allowed to be output in the current interface.

At step 203, when the terminal determines that the operating information does not satisfy the output condition, the terminal does not allow to output the communication message in the current interface.

Noticeably, it is explained in the example of the present disclosure that the identity of the user is successfully authenticated by the terminal; when the identity of the user fails to be authenticated by the terminal, the terminal does not allow to output the communication message in the current interface. In practice, when the terminal determines that the operating information satisfies the output condition at step 203, but the identity of the user fails to be authenticated, the terminal does not allow to output the communication message in the current interface either to ensure the safety of the communication message, which is not elaborated by the example of the present disclosure.

It should be further noted that the sequences of the steps of the method of outputting a communication message provided by the example of the present disclosure can be adjusted properly, and the steps may also be correspondingly added or removed in accordance with situations. Any changed method easily derived by persons skilled in the art within the technical scope disclosed by the present disclosure shall falls within the protection scope of the present disclosure, and will not be elaborated herein.

In conclusion, the method of outputting a communication message provided by the examples of the present disclosure solves the problem of the complicated communication message output process and simplifies the communication message output process since the terminal outputs the communication message in the current interface when the operating information satisfies the output condition and does not need to switch to other interfaces.

In some applications, it is possible to provide a feature in the terminal to enable the selection of the method for displaying the communication message. For example, the terminal may provide a setting that allows a user to select the communication message to be display in the way described above. Alternatively, the terminal may provide a setting that allows the user to select the communication message to be delivered in the preset APP even though the above described method to display the communication message may be a default setting.

The method of outputting a communication message provided by the examples of the present disclosure is illustrated in the following with the communication message being exemplarily a chat message between Lily and Lucy, and the terminal may be a cellphone.

Lily sends a chat message of "Dinner together after work" to Lucy via a cellphone. Lucy operates her own when receiving the chat message and her cellphone can detect the corresponding operating information triggered and obtain the output condition corresponding to the chat message, to judge whether the operating information satisfies the output condition. When the operating information satisfies the output condition, Lucy's cellphone outputs the chat message of "Dinner together after work" in the current interface, which can be the main interface of her cellphone. The chat message output process is simplified since the cellphone directly outputs the chat message of "Dinner together after work" in the current interface and does not switch to other interfaces.

The device example of the present disclosure is described hereinafter, which may be used for implementing the method example of the present disclosure. For the details not described in the device example of the present disclosure, the method example of the present disclosure can be used as references.

Figure 10:
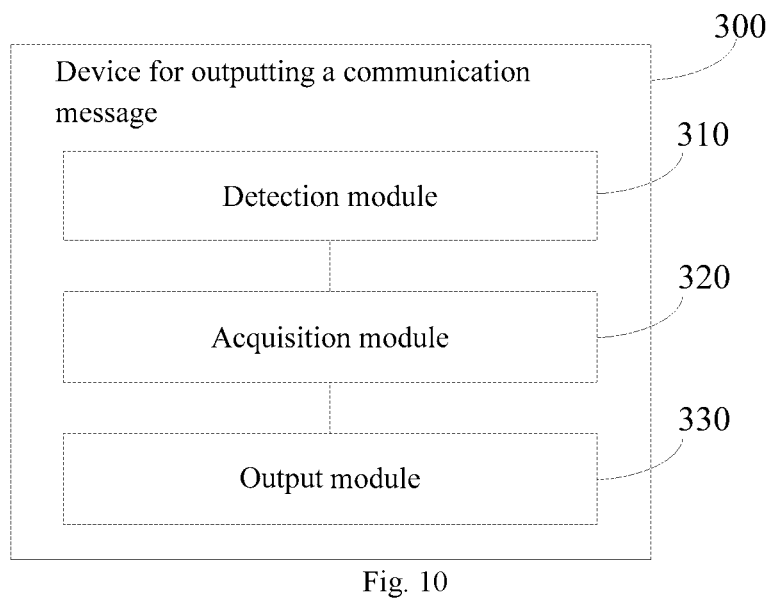
FIG. 10 is a block diagram of a device for outputting a communication message shown in accordance with an example.

FIG. 10 is a block diagram of a device 300 for outputting a communication message shown in accordance with an example. The device 300 for outputting a communication message may become part or all of a terminal through software, hardware or a combination thereof. Referring to FIG. 10, the device 300 for outputting a communication message may include: a detection module 310 configured to, when a communication message is received, detect operating information corresponding to a terminal, the operation instructed by the operating information being different from an interface switching operation; an acquisition module 320 configured to acquire an output condition corresponding to the communication message to respond to the operating information detected; and an output module 330 configured to, when the operating information satisfies the output condition, output the communication message in a current interface, the current interface being different from a display interface corresponding to the communication message.

In conclusion, the device for outputting a communication message provided by the example of the present disclosure solves the problem of complicated communication message output process and simplifies the communication message output process since the terminal outputs the communication message in the current interface when the operating information satisfies the output condition and does not need to switch to other interfaces.

In some examples, the detection module 310 may be configured to: detect operating information corresponding to the terminal in a preset time period, the operation instructed by the operating information being different from an interface switching operation; wherein, the preset time period is a time period from a current moment to a moment that the communication message is received.

In some examples, the operating information instructs at least one of the following operations: jittering, moving to a target position, and changing orientation.

In some examples, the operating information instructs the operation of moving to the target position; and the output condition includes: at the target position, a distance between a target component of the terminal and a target object is shorter than a preset distance.

In some examples, the target component includes a handset, and the target object includes a user's ears.

In some examples, the operating information instructs the operation of jittering; and the output condition includes at least one of the followings: jittering times are the same as preset times, and jittering amplitude is greater than a preset amplitude.

In some examples, the operating information instructs the operation of changing orientations; and the output condition includes at least one of the followings: a changed orientation is the same as a preset orientation and an orientation changing process is the same as a preset orientation changing process.

In some examples, the output module 330 may be configured to be at least one of the followings: playing the communication message in a current interface, when the communication message includes: an audio message or a video message; and displaying the communication message in the current interface, when the communication message includes a text message.

In some examples, the output module 330 may be configured to: determine a target display area for displaying the communication message in the current interface in accordance with content displayed on the current interface, when the communication message includes a text message; and display the communication message in the target display area.

In conclusion, the device for outputting a communication message provided by the example of the present disclosure solves the problem of complicated communication message output process and simplifies the communication message output process since the terminal outputs the communication message in the current interface when the operating information satisfies the output condition and does not need to switch to other interfaces.

The examples of the present disclosure further provide a device for outputting a communication message, comprising: one or more processors; and a memory storage. The memory storage stores one or more programs configured to be executed by the one or more processors to execute the above programs for performing the methods for outputting the communication message in the examples described above.

With respect to the device in the above examples, the specific approach for performing operations for individual module therein has been described in detail in the method examples and is not elaborated herein.

Figure 11:
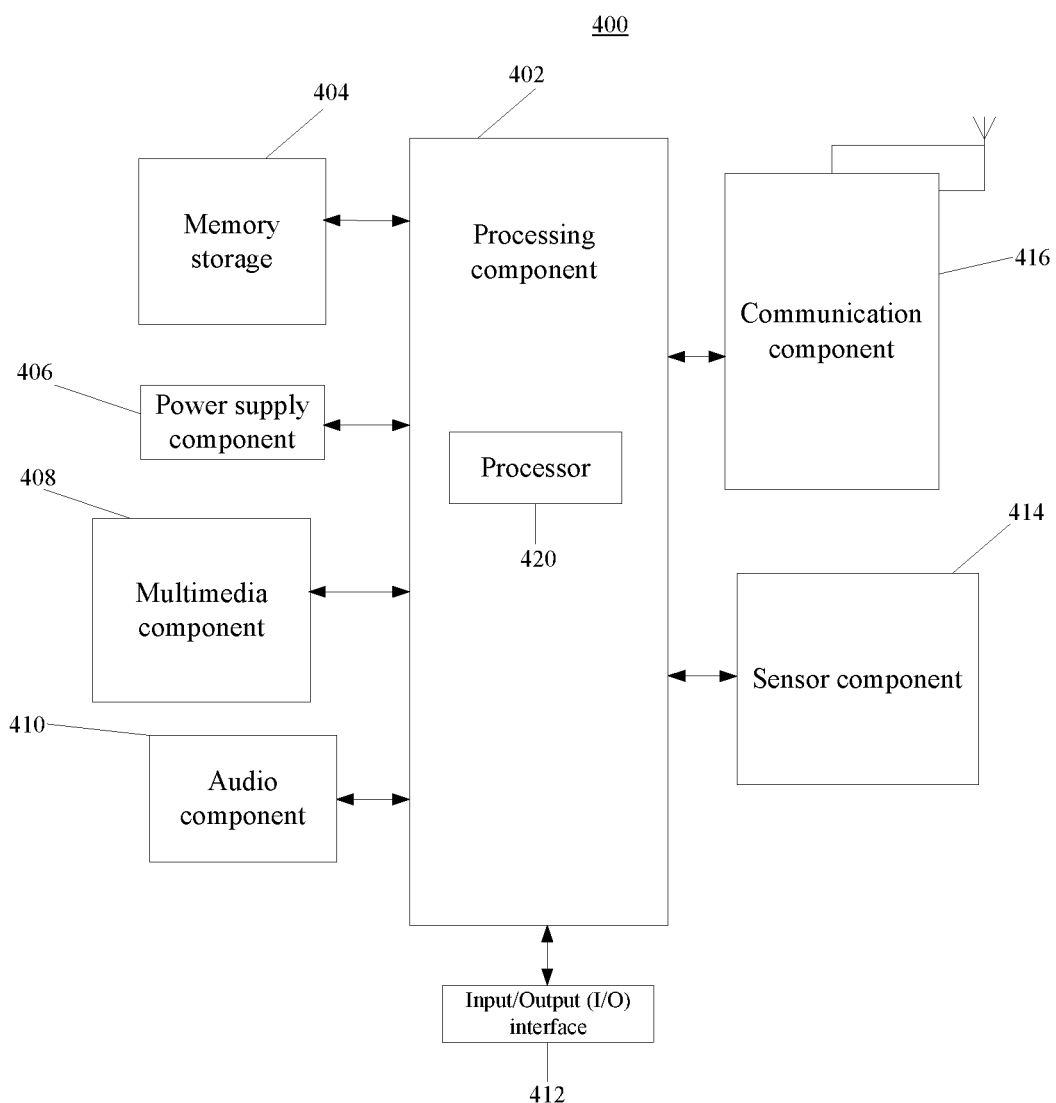
FIG. 11 is a block diagram of a device for outputting a communication message shown in accordance with another example.

Please refer to FIG. 11, which illustrates a block diagram of a device 400 for outputting a communication message shown in accordance with an example. For example, the device 400 may be a mobile phone, a computer, a digital broadcast terminal, a messaging device, a gaming console, a tablet, a medical device, an exercise equipment, a personal digital assistant, and the like.

Referring to FIG. 11, the device 400 may include one or more of the following components: a processing component 402, a memory 404, a power supply component 406, a multimedia component 408, an audio component 410, an input/output (I/O) interface 412, a sensor component 414, and a communication component 416.

The processing component 402 generally controls the overall operation of the device 400, such as the operations associated with display, telephone calls, data communications, positioning, camera operations, and recording operations. The processing component 402 may include one or more processors 420 to execute instructions to complete all or part of the steps in the above method of outputting a communication message. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 may be configured to store various types of data to support the operation of the device 400. The examples of such data include instructions for any application or method, contact data, phonebook data, messages, pictures, video, and the like, that operate on the device 400. The memory 404 may be implemented by any type of volatile or non-volatile memory device, or a combination thereof, such as a static random access memory (SRAM), an electrically erasable programmable read-only memory (EEPROM), an erasable programmable read only memory (EPROM), a programmable read only memory (PROM), a read-only memory (ROM), a magnetic memory, a flash memory, a disk or a CD.

The power supply component 406 provides electric power to various components of the device 400. The power supply component 406 may include a power management system, one or more power supplies, and other components associated with the generation, management, and distribution of power for the device 400.

The multimedia component 408 includes a screen providing an output interface between the device 400 and the user thereof. In some examples, the screen may include a liquid crystal display (LCD) and a touch panel (TP). If the screen includes a touch panel, the screen may be implemented as a touch screen to receive input signals from the user of the device 400. The touch panel includes one or more touch sensors to sense touches, slides, and orientations on the touch panel. The touch sensors may not only sense a boundary of a touch or slide action, but also sense the duration and pressure of the touch or slide action. In some examples, the multimedia component 408 includes a front camera and/or a rear camera. The front camera and/or the rear camera may receive external multimedia data when the device 400 is in an operation mode, such as a photographing mode or a video mode. Each front camera and rear camera may be a fixed optical lens system or have focus and optical zoom capability.

The audio component 410 may be configured to output and/or input audio signals. For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some examples, the audio component 410 further includes a speaker to output audio signals.

The I/O interface 412 provides an interface between the processing component 402 and peripheral interface modules, such as a keyboard, a mouse, buttons, and the like. These buttons may include, but are not limited to: a home button, a volume button, a start button, and a lock button.

The sensor component 414 includes one or more sensors to provide status assessments of various aspects of the device 400. For instance, the sensor component 414 may detect an on/off state of the device 400, relative position of components, e.g., the display and the keypad of the device 400, a position change of the device 400 or a component of the device 400, presence or absence of user contact with the device 400, an orientation or an acceleration/deceleration of the device 400, and the temperature change of the device 400. The sensor component 414 may include a proximity sensor configured to detect the presence of nearby objects without any physical contact. The sensor component 414 may also include a light sensor, such as a complementary metal oxide semiconductor (CMOS) or charge-coupled device (CCD) image sensor, for use in imaging applications. In some examples, the sensor component 414 may also include an acceleration sensor, a gyroscope sensor, a magnetic sensor, a pressure sensor, or a temperature sensor.

The communication component 416 may be configured to facilitate wired or wireless communication between the device 400 and other devices. The device 400 can access a wireless network based on a communication standard, such as wireless fidelity (WIFI), 2G, 3G, or a combination thereof. In one example, the communication component 416 receives a broadcast signal or broadcast associated information from an external broadcast management system via a broadcast channel. In one example, the communication component 416 further includes a near field communication (NFC) module to facilitate short-range communications. For example, the NFC module may be implemented based on a radio frequency identification (RFID) technology, an infrared data association (IrDA) technology, an ultra wideband (UWB) technology, a Bluetooth (BT) technology, and other technologies.

In examples, the device 400 may be implemented with one or more application specific integrated circuits (ASIC), digital signal processor (DSP), digital signal processing devices (DSPD), programmable logic devices (PLD), field-programmable gate arrays (FPGA), controllers, micro-controllers, microprocessors, or other electronic components, for performing the method of outputting a communication message described above.

In examples, there is also provided a non-transitory readable storage medium including instructions, such as memory storage 404 including instructions. The instructions may be executed by the processor 420 in the device 400, for performing the method of outputting a communication message described above. For example, the non-transitory readable storage medium may be a ROM, a random access memory (RAM), a compact disk read-only memory (CD-ROM), a magnetic tape, a floppy disc, an optical data storage device, and the like.

A non-transitory readable storage medium comprising instructions executed by the processor of the device 400 for enabling the device 400 to perform a method of outputting a communication message, the method comprising: detecting operating information corresponding to a terminal when a communication message is received, the operation instructed by the operating information being different from an interface switching operation; acquiring an output condition corresponding to the communication message to respond to the operating information detected; and outputting the communication message in a current interface when the operating information satisfies the output condition, the current interface being different from a preset display interface corresponding to the communication message.

In conclusion, the device for outputting a communication message provided by the example of the present disclosure solves the problem of complicated communication message output process and simplifies the communication message output process since the terminal outputs the communication message in the current interface when the operating information satisfies the output condition and does not need to switch to other interfaces.

The examples of the present disclosure also provide a device for outputting a communication message. The device includes: a processor; and a storage storing instructions executed by the processor; wherein, the processor may be configured to performing the method of outputting a communication message in the above method example.

The examples of the present disclosure also provide a non-transitory readable storage medium comprising instructions. The instructions can be executed on a processing component for performing the method of outputting a communication message shown in FIG. 1 or FIG. 2.

According to one aspect of the present disclosure, a method of outputting a communication message is provided and includes: detecting operating information corresponding to a terminal when a communication message is received, the operation instructed by the operating information being different from an interface switching operation; acquiring an output condition corresponding to the communication message to respond to the operating information detected; and outputting the communication message in a current interface when the operating information satisfies the output condition, the current interface being different from a display interface corresponding to the communication message.

In some examples, detecting the operating information corresponding to the terminal includes: detecting the operating information corresponding to the terminal in a preset time period;

where the preset time period is a time period from a current moment to a moment that the communication message is received.

In some examples, operating information instructs at least one of the following operations: jittering, moving to a target position, and changing orientations.

In some examples, the operating information instructs the operation of moving to the target position; and the output condition includes: at the target position, a distance between a target component of the terminal and a target object is shorter than a preset distance.

In some examples, the target component includes a handset, and the target object includes a user's ears.

In some examples, the operating information instructs the operation of jittering; and the output condition includes at least one of the followings: jittering times are the same as preset times, and jittering amplitude is greater than a preset amplitude.

In some examples, the operating information instructs the operation of changing orientations; and the output condition includes at least one of the followings: changed orientation is the same as a preset orientation and orientation changing process is the same as a preset orientation changing process.

In some examples, outputting the communication message in the current interface includes at least one of the followings: playing the communication message in the current interface, when the communication message includes an audio message or a video message; and displaying the communication message in the current interface, when the communication message includes a text message.

In some examples, displaying the communication message in the current interface when the communication message including the text may further include:

determining a target display area for displaying the communication message in the current interface in accordance with content displayed in the current interface, when the communication message includes a text message; and displaying the communication message in the target display area.

According to another aspect of the present disclosure, a device for outputting a communication message is provided and includes: one or more processors; and a memory storage; wherein, the memory storage stores one or more programs configured to be executed by the one or more processors, and the one or more programs comprise an instruction to: detect operating information corresponding to a terminal when a communication message is received, the operation instructed by the operating information being different from an interface switching operation; acquire an output condition corresponding to the communication message to respond to the operating information detected; and output the communication message in a current interface when the operating information satisfies the output condition, the current interface being different from a display interface corresponding to the communication message.

In some examples, the one or more programs comprise an instruction to: detect the operating information corresponding to the terminal in a preset time period; wherein, the preset time period is a time period from a current moment to a moment that the communication message is received.

In some examples, the operating information instructs at least one of the following operations: jittering, moving to a target position, and changing orientations.

In some examples, the operating information instructs the operation of moving to the target position; and the output condition includes: at the target position, a distance between a target component of the terminal and a target object is shorter than a preset distance.

In some examples, the target component includes a handset, and the target object includes a user's ear.

In some examples, the operating information instructs the operation of jittering; and the output condition includes at least one of the followings: jittering times are the same as a preset number, and a jittering amplitude is greater than a preset amplitude.

In some examples, the operating information instructs the operation of changing an orientation of the terminal; and the output condition includes at least one of the followings: the changed orientation is the same as a preset orientation and an orientation changing process is the same as a preset orientation changing process.

In some examples, the one or more programs comprise an instruction to: play the communication message in the current interface, when the communication message includes an audio message or a video message; and display the communication message in the current interface, when the communication message includes a text message.

In some examples, the one or more programs may include an instruction to: determine a target display area for displaying the communication message in the current interface in accordance with content displayed in the current interface, when the communication message includes a text message; and display the communication message is in the target display area.

According to an additional aspect of the present disclosure, a device for outputting a communication message is provided and includes: a processor; and a storage for storing instruction executed by the processor; wherein the processor may be configured to: detect operating information corresponding to a terminal when a communication message is received, the operation instructed by the operating information being different from an interface switching operation; acquire an output condition corresponding to the communication message to respond to the operating information detected; and output the communication message in a current interface when the operating information satisfies the output condition, the current interface being different from a display interface corresponding to the communication message.

According to yet another aspect of the present disclosure, there is provided a non-transitory readable storage medium comprising instructions. The instructions can be executed on a processing component for performing the method of outputting a communication message provided in either the first aspect or the second aspect.

The technical solutions provided by the examples of the present disclosure may include the following advantageous effects:

According to the technical solutions provided by the examples of the present disclosure, when the communication message is received, the terminal detects the operating information corresponding to the terminal, the operation instructed by the operating information being different from the interface switching operation, acquires the output condition corresponding to the communication message to respond to the operating information detected, and outputs the communication message in the current interface when the operating information satisfies the output condition, the current interface being different from the preset display interface corresponding to the communication message. Because the terminal outputs the communication message in the current interface and does not need to switch to other interfaces, the problem of complicated communication message output process is solved and the communication message output process is simplified.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

In the present disclosure, term "and/or" describes the correspondence of the corresponding objects merely, representing three kinds of relationship. For example, A and/or B, may represent: three kinds of relationship including A exists alone, A and B exist concurrently, and B exists alone. Moreover, the character "/" herein generally indicates that the context objects before and after are in an "OR" relationship.

Other examples of the present disclosure will be available to those who are skilled in the art upon consideration of the specification and practice of the disclosure disclosed herein. This application is intended to cover any variations, uses, or adaptations of the present disclosure following the general principles thereof and include common general knowledge or conventional technical means in the art without departing from the present disclosure. The specification and examples be considered as exemplary only and the true scope and spirit of the present disclosure are indicated by the following claims.

Understandably, the present disclosure is not limited to the exact construction described above and illustrated in the accompanying drawings, and various modifications and changes can be made without departing from the scope thereof. The scope of the present disclosure can only be limited by the appended claims.

What is claimed is:

1. A method of outputting a communication message, comprising:

detecting, in response to a communication message being received by a terminal, operating information in the terminal in a preset time period, wherein the operating information indicates existence of an operation that is different from an interface switching operation, is at least one selected from: jittering the terminal, moving the terminal to a target position, and changing an orientation of the terminal, and is performed on the terminal after the receipt of the communication message;

acquiring, in response to detecting the operating information, an output condition corresponding to the operating information; and outputting the communication message in a current interface when the operating information satisfies the output condition, wherein the current interface is different from a display interface of a communication App that is preset for displaying the communication message;

wherein the communication message is a chat message sent by the communication App;

wherein outputting the communication message in the current interface comprises: playing the communication message in a screen lock interface without unlocking the terminal when the current interface is the screen lock interface;

wherein when the operating information indicates that the operation is moving the terminal to the target position, the output condition comprises: a distance between a target component of the terminal and a target object is shorter than a preset distance;

when the operating information indicates that the operation is jittering the terminal, the output condition comprises at least one of: jittering times match a preset number, or a jittering amplitude is greater than a preset amplitude;

when the operating information indicates that the operation is changing the orientation of the terminal, the output condition comprises at least one of: a changed orientation is the same as a preset orientation, or an orientation changing process is the same as a preset orientation changing process.

2. The method according to claim 1, wherein the communication message comprises at least one of:

playing the communication message in the current interface when the communication message comprises: an audio message or a video message; and displaying the communication message in the current interface when the communication message comprises a text message.

3. The method according to claim 2, wherein displaying the communication message in the current interface when the communication message comprises the text message comprises:

determining a target display area for displaying the communication message in the current interface in accordance with content displayed on the current interface when the communication message comprises the text message; and displaying the communication message in the target display area.

4. The method according to claim 1, wherein the target component comprises a handset, and the target object comprises a user's ear.

5. A device for outputting a communication message, comprising:

one or more processors; and a memory storage that stores one or more programs that are executable by the one or more processors;

wherein the one or more processors are configured to:

detect, in response to a communication message being received by a terminal, operating information in the terminal in a preset time period, wherein the operating information indicates existence of an operation that is different from an interface switching operation, is at least one selected from: jittering the terminal, moving the terminal to a target position, and changing an orientation of the terminal, and is performed on the terminal after the receipt of the communication message;

acquire, in response to detecting the operating information, an output condition corresponding to the operating information; and output the communication message in a current interface when the operating information satisfies the output condition, wherein the current interface is different from a display interface of a communication App that is preset for displaying the communication message;

wherein the communication message is a chat message sent by the communication App;

wherein outputting the communication message in the current interface comprises: playing the communication message in a screen lock interface without unlocking the terminal when the current interface is the screen lock interface;

wherein when the operating information indicates that the operation is moving the terminal to the target position, the output condition comprises: a distance between a target component of the terminal and a target object is shorter than a preset distance;

when the operating information indicates that the operation is jittering the terminal, the output condition comprises at least one of: jittering times match a preset number, or a jittering amplitude is greater than a preset amplitude;

when the operating information indicates that the operation is changing the orientation of the terminal, the output condition comprises at least one of: a changed orientation is the same as a preset orientation, or an orientation changing process is the same as a preset orientation changing process.

6. The device according to claim 5, wherein the one or more processors are further configured to:

play the communication message in the current interface when the communication message comprises: an audio message or a video message; and display the communication message in the current interface when the communication message comprises a text message.

7. The device according to claim 6, wherein the one or more processors are further configured to:

determine a target display area for the displayed communication message in the current interface in accordance with content displayed on the current interface when the communication message includes the text message; and display the communication message in the target display area.

8. A non-transitory computer-readable storage medium comprising instructions stored therein, when the instructions are executed by a processor, causes the processor to:

detect, in response to a communication message being received by a terminal, operating information in the terminal in a preset time period, wherein the operating information indicates existence of an operation that is different from an interface switching operation, is at least one selected from: jittering the terminal, moving the terminal to a target position, and changing an orientation of the terminal, and is performed on the terminal after the receipt of the communication message;

acquire, in response to the operating information as detected, an output condition corresponding to the operating information; and output the communication message in a current interface when the operating information satisfies the output condition, wherein the current interface is different from a display interface of a communication App that is preset for displaying the communication message;

wherein the communication message is a chat message sent by the communication App;

wherein outputting the communication message in the current interface comprises: playing the communication message in a screen lock interface without unlocking the terminal when the current interface is the screen lock interface;

wherein when the operating information indicates that the operation is moving the terminal to the target position, the output condition comprises: a distance between a target component of the terminal and a target object is shorter than a preset distance;

when the operating information indicates that the operation is jittering the terminal, the output condition comprises at least one of: jittering times match a preset number, or a jittering amplitude is greater than a preset amplitude;

when the operating information indicates that the operation is changing the orientation of the terminal, the output condition comprises at least one of: a changed orientation is the same as a preset orientation, or an orientation changing process is the same as a preset orientation changing process.

9. The device according to claim 5, wherein the target component comprises a handset, and the target object comprises a user's ear.

* * * * *